United States Patent [19]

Inoue

[11] Patent Number: 5,325,471
[45] Date of Patent: Jun. 28, 1994

[54] METHOD OF AND APPARATUS FOR MODIFYING IMAGE BY ADJUSTING MODIFICATION COEFFICIENTS

[75] Inventor: Toshifumi Inoue, Kyoto, Japan

[73] Assignee: Dainippon Screen Mfg. Co., Ltd., Japan

[21] Appl. No.: 762,860

[22] Filed: Sep. 18, 1991

[30] Foreign Application Priority Data

Sep. 18, 1990 [JP] Japan ............................. 2-248121

[51] Int. Cl.$^5$ ............................................. G06F 15/62
[52] U.S. Cl. ................................... 395/127; 395/126; 395/130; 395/131
[58] Field of Search ................ 395/131, 123, 126–127, 395/130, 142, 149

[56] References Cited

U.S. PATENT DOCUMENTS 5,031,117 7/1991 Minor et al. ....................... 395/131
5,051,928 9/1991 Gruters .............................. 395/131

FOREIGN PATENT DOCUMENTS 8200903 3/1982 European Pat. Off. ........ G03F 3/08

OTHER PUBLICATIONS

Computer Graphics Principles and Practice, Foley et al., pp. 132–142, 1990.

Primary Examiner—Mark K. Zimmerman
Assistant Examiner—Almis Jankus
Attorney, Agent, or Firm—Ostrolenk, Faber, Gerb & Soffen

[57] ABSTRACT

A method in which the distribution of a retouch coefficient in a subject region is specified by two data tables so that the retouch coefficient is readily changed at a high speed. A distance table 61 includes distance data Dd each representing a distance between a center pixel and each of the other pixels. A coefficient table 62 includes values of a retouch coefficient Kb dependent on the distance data Dd. The retouch coefficient Kb is changed by only rewriting the coefficient table 62. The retouch coefficient Kb at each pixel is determined based on the distance table 61 and the coefficient table 62 and is added to image data Di to modify the image data Dr.

14 Claims, 9 Drawing Sheets

| Dd | Ka |
|----|----|
| 0  | 10 |
| 1  | 6  |
| 2  | 2  |
| 3  | 0  |
| 4  | 0  |
| 5  | 0  |

| Dd | Kb |
|----|----|
| 0  | 10 |
| 1  | 7  |
| 2  | 4  |
| 3  | 1  |
| 4  | 0  |
| 5  | 0  |

| Dd | Kc |
|----|----|
| 0  | 10 |
| 1  | 8  |
| 2  | 6  |
| 3  | 4  |
| 4  | 2  |
| 5  | 1  |

| 102 | 112 | 116 | 116 | 116 | 112 | 102 |
|---|---|---|---|---|---|---|
| 102 | 112 | 122 | 126 | 122 | 112 | 102 |
| 102 | 112 | 126 | 130 | 126 | 112 | 102 |
| 102 | 112 | 122 | 126 | 122 | 112 | 102 |
| 102 | 112 | 116 | 116 | 116 | 112 | 102 |

(Note: reading columns as shown: 102,112,116,116,116,112,102 / 102,112,122,126,130,126,122,112,102 ... )

Fig. 8(d) Di

| 100 | 110 | 120 | 130 | 140 |
|---|---|---|---|---|
| 100 | 110 | 120 | 130 | 140 |
| 100 | 110 | 120 | 130 | 140 |
| 100 | 110 | 120 | 130 | 140 |
| 100 | 110 | 120 | 130 | 140 |

Fig. 8(b) 62

| Dd | Kb |
|---|---|
| 0 | 10 |
| 1 | 6 |
| 2 | 2 |

Fig. 8(a) 61 Dd

| 2 | 2 | 2 | 2 | 2 |
|---|---|---|---|---|
| 2 | 1 | 1 | 1 | 2 |
| 2 | 1 | 0 | 1 | 2 |
| 2 | 1 | 1 | 1 | 2 |
| 2 | 2 | 2 | 2 | 2 |

Fig. 8(c) Kb

| 2 | 2 | 2 | 2 | 2 |
|---|---|---|---|---|
| 2 | 6 | 6 | 6 | 2 |
| 2 | 6 | 10 | 6 | 2 |
| 2 | 6 | 6 | 6 | 2 |
| 2 | 2 | 2 | 2 | 2 |

METHOD OF AND APPARATUS FOR MODIFYING IMAGE BY ADJUSTING MODIFICATION COEFFICIENTS

BACKGROUND OF THE INVENTION

1. Field of the Invention

The present invention relates to image modification, and more particularly to image modification with the aid of a computer.

2. Description of the Related Art

In printing process, images are often modified by the technique called retouching. Retouching includes dot etching and color correction, which in the past have been a manual labor by a skilled operator. Recent developments in computer technology have enabled various image processors to execute image modification including the retouching by means of data processing.

Image modification process with the aid of a computer is described in International Patent Application PCT/DE80/00070 (or International Patent Laid-Open WO 80/02607), Japanese Laid-Open Gazette Hei-1-232482, and German Patent Application P3110222.0 (or Japanese Patent Laid-Open Gazette Sho-57-161858).

Figure 1:
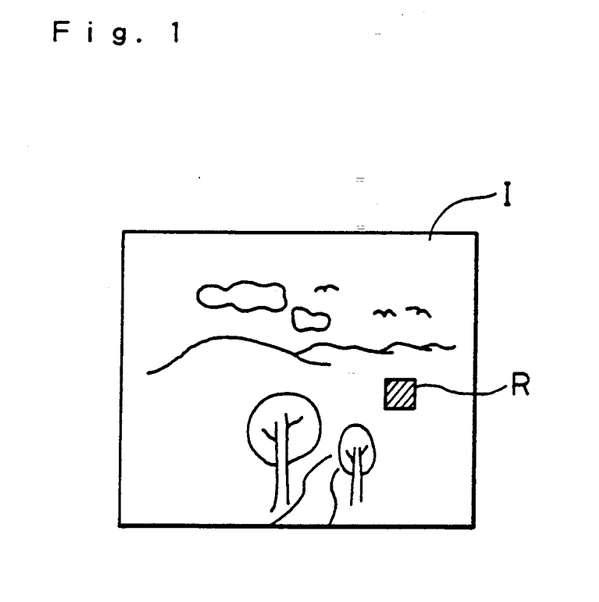
FIG. 1 is a view showing a color image to be retouched.

FIG. 1 is a view illustrating a color image I to be modified. The color image I is defined by four color signals representing concentrations of four colors Y (for yellow), M (for magenta), C (for cyan), and K (for black) in 256 gradations. In conventional automatic image modification, with the aid of an image processor, an operator specifies a subject region R to be modified with, for example, a digitizer and an electronic pen (or a stylus pen) on the color image I which is displayed on a color display.

Figure 2:
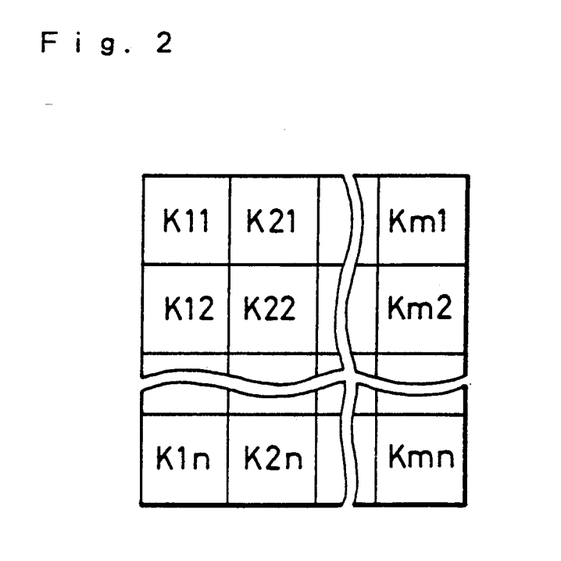
FIG. 2 is an explanatory view showing the intensity of retouch effect at each pixel in a subject region.

Suppose an image of the Y (yellow) plate in the subject region R is processed by dot etching. Dot etching is image modification which changes a concentration level of pixels within a part of an image. As shown in FIG. 2, retouch coefficients K11 through Kmn each representing the intensity of a retouch effect (amount of dot etching) at each pixel in the subject region R are stored in advance in a coefficient table of the image processor. When the subject region R is specified by the operator, the retouch coefficients K11 through Kmn are added to the image data of the Y plate within the subject region. Here the subject region R includes m×n pixels, where m and n are integers and range from a few tens to several hundreds.

The intensity of the retouch effect usually depends on the position of a pixel in the image I. While observing the color display, the operator specifies the location of a subject region with a digitizer and changes the intensity of the retouch effect. Accordingly, the subject region of the image I is appropriately retouched.

In the conventional image processors described above, all retouch coefficients stored in a coefficient table (or in a memory) should be rewritten each time when the intensity of the retouch effect is changed. Such rewriting is laborious and time consuming; every time the operator changes the intensity of the retouch effect, the retouch process is interrupted by rewriting of the retouch coefficients in the coefficient table. This rewriting reduces the efficiency of the the image processors.

SUMMARY OF THE INVENTION

An object of the invention is to change the image modification effect without rewriting modification coefficients for all pixels in a region to be modified.

The present invention is directed to an image processor for modifying an image, comprising:

an image memory for storing image data;

image display means for displaying an image based on the image data;

input means for specifying a location of a subject region to be modified on the displayed image and adjusting a parameter which is used to determine modification effect;

reading means for reading out image data-part of the subject region from the image memory on the basis of at least the location;

distance data generation means for generating distance data for each pixel in the subject region, the distance data indicating a distance between a reference pixel and each pixel in the subject region;

coefficient determination means for determining a coefficient representing the modification effect depending on the distance data on the basis of the parameter; and arithmetic processing means for processing the image data-part on the basis of the coefficient to thereby modify the image data.

Preferably, the distance data generation means stores standard distance data in a prescribed area larger than the subject region where the standard distance data indicates a distance between a reference pixel and each pixel in the prescribed area, and outputs the distance data out of the standard distance data on the basis of the location.

The coefficient determination means stores a standard coefficient and determines the coefficient by modifying the standard coefficient with the parameter.

Further, the image display means displays the subject region in the image as a function of the location.

The coefficient determination means determines the coefficient so that the coefficient at the reference pixel in the subject region remains the same while the coefficient at the other pixels in the subject region changes in proportion to the parameter.

Alternatively, the coefficient determination means also determines the coefficient so that the coefficient in the subject region changes in proportion to the parameter while the size of the subject region where the coefficient has a nonzero value stays the same.

In the embodiment, the input means comprises a pointing device for specifying the location on the image display means, and a control device for adjusting the parameter.

Alternatively, the input means comprises a pressure sensitive electronic pen which outputs a first signal representing the location corresponding the position of the pen on the display means and a second signal representing the parameter according to the pressure given on the pen.

The present invention is also directed to a method of modifying an image, comprising the steps of:

(a) preparing image data;

(b) displaying an image based on the image data;

(c) specifying a location of a subject region to be modified on the displayed image and adjusting a parameter which is used to determine modification effect;

(d) reading out image data-part of the subject region from the image memory on the basis of at least the location;

(e) generating distance data for each pixel in the subject region, the distance data indicating a distance between a reference pixel and each pixel in the subject region;

(f) determining a coefficient representing the modification effect depending on the distance data on the basis of the parameter; and (g) processing the image data-part on the basis of the coefficient to thereby modify the image data.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 3:
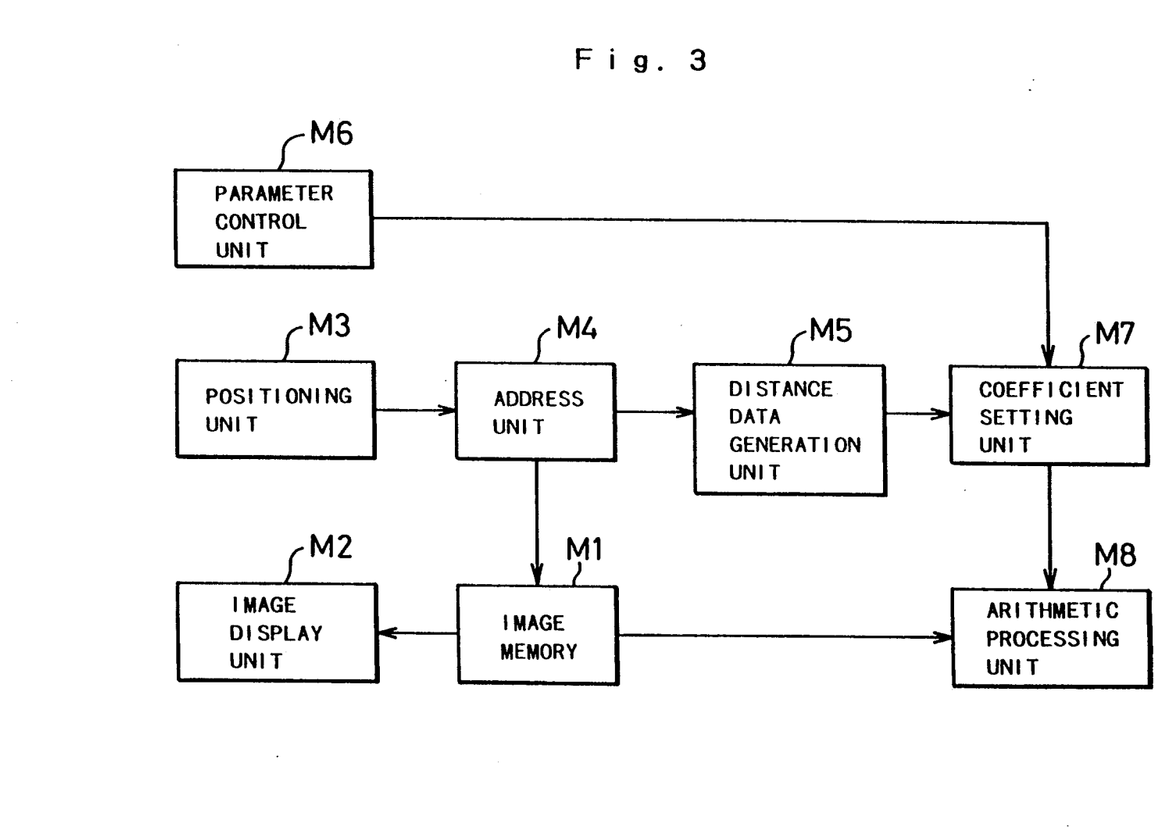
FIG. 3 is a block diagram showing the basic structure of an image processor according to the invention.

FIG. 3 is a general block diagram of an image processing apparatus according to the present invention.

The image processing apparatus comprises the following eight units:

Image memory M1 stores image data. Image display unit M2 displays an image based on the image data. Positioning unit M3 is used to specify a location of a subject region which is to be modified on the displayed image. Address unit M4 generates an address of the subject region in the image memory based on at least the location specified by the positioning unit, and reads out image data of the subject region from the image memory. Distance data generation unit M5 generates distance data indicating a distance between a predetermined standard pixel in a predetermined retouchable region and each of the remaining pixels in the retouchable region. The unit M5 also outputs the distance data for each pixel in the subject region according to the address given by the address unit. Parameter control unit M6 adjusts a distribution parameter defining a distribution of a retouch coefficient representing the intensity of a retouch effect at each pixel in the retouchable region. Coefficient setting unit M7 stores a reference value of the retouch coefficient corresponding to each of the distance data. The unit M7 also determines a distribution of the retouch coefficient in the subject region based on the distribution parameter and the distance data output from the distance data output unit. Arithmetic processing unit M8 processes the image data of the subject region output from the image memory and the distribution of the retouch coefficient determined by the coefficient setting unit, thereby modifying the image data.

The distribution of the retouch coefficient is determined by a combination of the distance data stored in the distance data generation unit M5 and values of the retouch coefficient corresponding to the distance data by the coefficient setting unit M7. Each reference value of the retouch coefficient is stored in the coefficient setting unit M7. The distribution of the retouch coefficient in the subject region is determined based on the distribution parameter adjusted by the parameter control unit M6. Accordingly, the intensity of the retouch coefficient is readily changed corresponding to each distance data by the coefficient setting unit M7 while the distance data is not changed.

Figure 4:
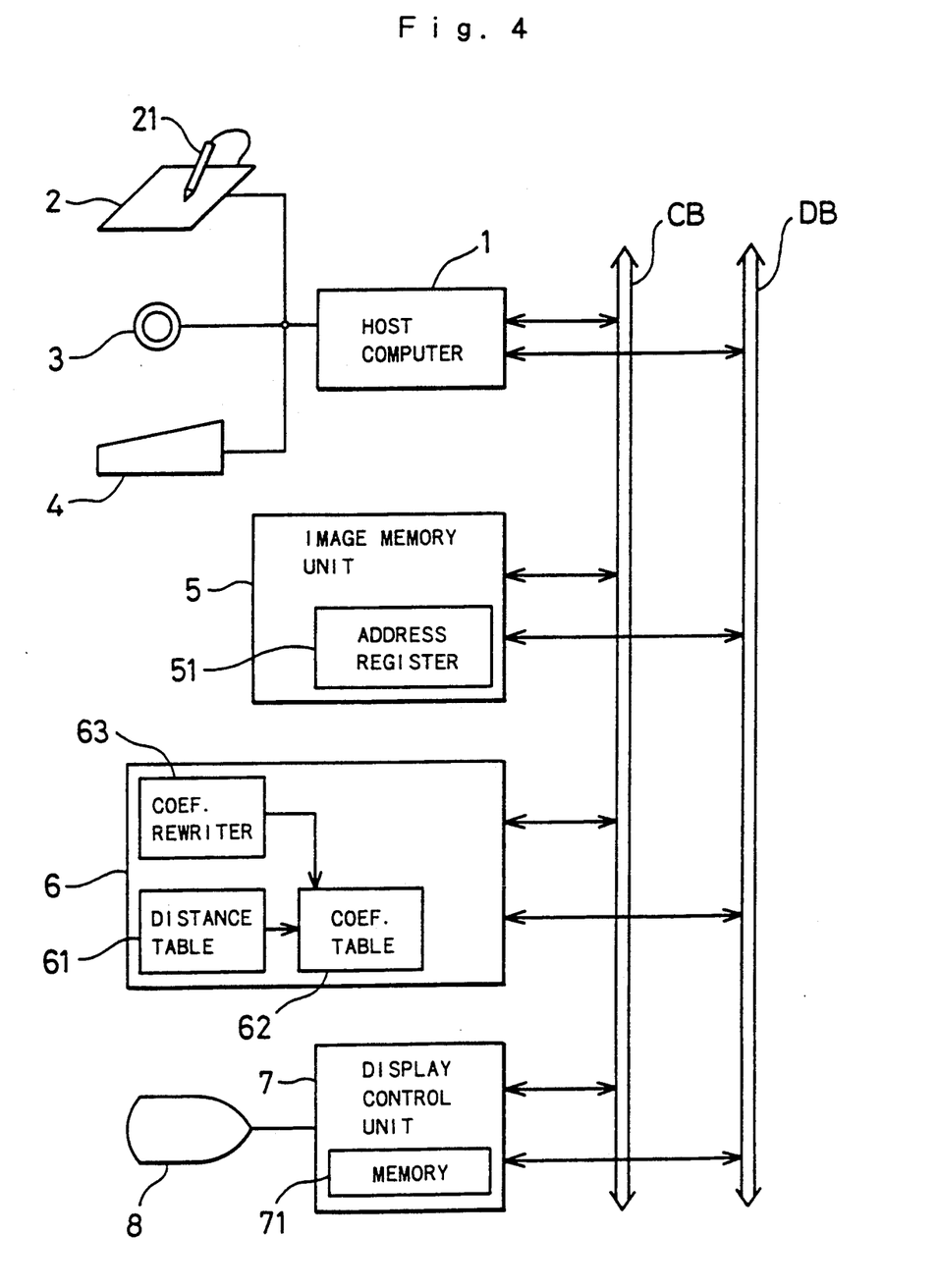
FIG. 4 is a block diagram showing the structure of an image processing system embodying the invention.

FIG. 4 is a block diagram illustrating the structure of an image processing system embodying the present invention. The image processing system includes a host computer 1 connected with a digitizer 2, retouch effect controller 3, and a keyboard 4. The retouch effect controller 3 controls a retouch effect, such as an amount of dot etching, dimensions of a subject region to be retouched, or a quantity of color correction. The retouch effect controller 3 is implemented with a variable resistor or a volume control. The digitizer 2 and the retouch effect controller 3 respectively act as the positioning unit M3 and the parameter setting unit M6 shown in FIG. 3.

The host computer 1 is connected to a CPU bus CB and a data bus DB. An image memory unit 5, an arithmetic processing unit 6, and a display control unit 7 are connected to one another via the buses CB and DB. The host computer 1 controls the whole image processing system.

The image memory unit 5 stores various image data and includes an address register 51, which generates an address of a subject region in the memory. The address register 51 is implemented by a software program carried out by a central processing unit or CPU (not shown) in the image memory unit 5.

The arithmetic processing unit 6 includes a distance table 61 for storing distance data. Each distance data indicates a distance between a reference position in a predetermined retouchable region and each pixel in the retouchable region. The retouchable region is a region in which the image is able to be retouched, and which is defined in advance.

The processing unit 6 also includes a coefficient table 62 for storing values of a retouch coefficient corresponding to distance data, and a coefficient rewriter 63 for rewriting values of the retouch coefficient stored in the coefficient table 62. The distance table 61 and the coefficient table 62 are stored in a RAM or random access memory (not shown) in the arithmetic processing unit 6. The coefficient rewriter 63 is implemented by a software program carried out by a CPU (not shown) in the arithmetic processing unit 6. The distance table 61 acts as the distance data generation unit M5 and the coefficient table 62 and the coefficient rewriter 63 act as the coefficient setting unit M7 shown in FIG. 3.

The display control unit 7 includes a display memory 71 for storing image data converted to RBG data and displays a color image on a color cathode ray tube (CRT) 8.

FIG. 5 is a schematic illustration showing the contents of the distance table 61 and the coefficient table 62.

Figure 5A:
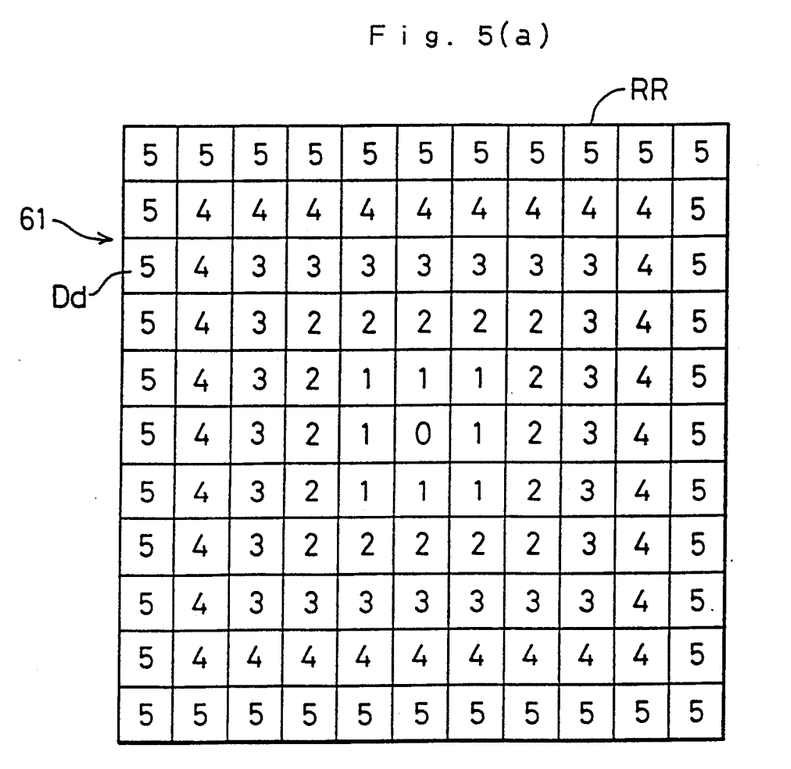
FIG. 5 is a view showing a distance table and a coefficient table.

FIG. 5(a) shows distance data Dd for each pixel in a retouchable region RR. Each distance data indicates a distance between a respective pixel and a reference position in the retouchable region RR. In the embodiment shown, reference position is the center of the retouchable region RR. The distance data ranges from zero to five as shown in FIG. 5(a).

The retouchable region RR defines a possible area for retouch process and includes 11×11 pixels in this embodiment. The retouchable region RR in a commercial image processing system will include, for example, 256×256 pixels.

The retouchable region RR is divided into five pixel layers. The outer pixel layers have greater values in the distance data Dd; that is, values of the distance data Dd increase from zero to five according to the positions of the pixel layers. Each value of the distance data Dd in FIG. 5(a) indicates the ordinal number of each pixel layer when counted from the center of the retouchable region RR.

Figure 5B:
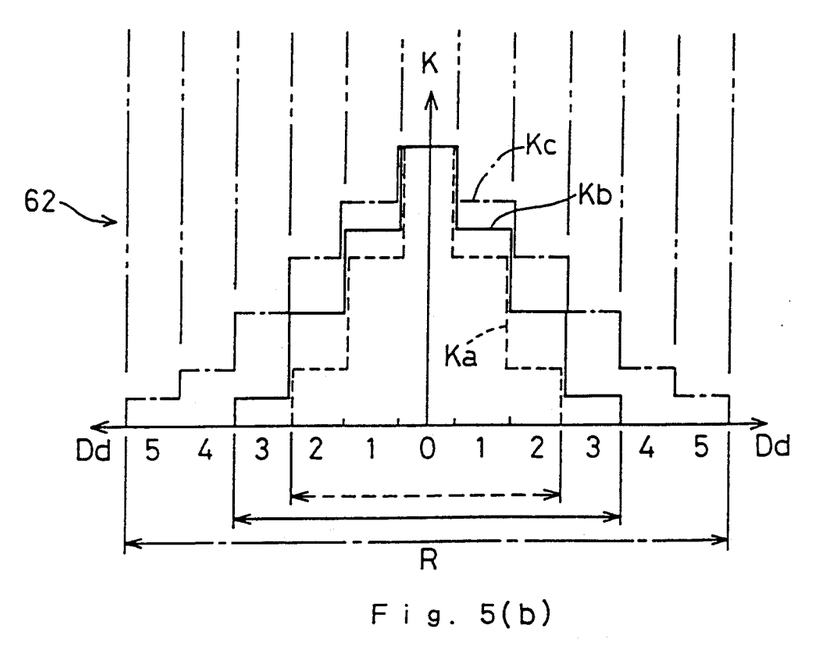

FIG. 5(b) shows the contents of the coefficient table 62, with distance data Dd as the abscissa and retouch coefficient K as the ordinate. The retouch coefficient K has a discrete value which varies as a function of the distance data Dd. A standard retouch coefficient Kb shown by a solid line has a peak or maximum value of 10 at the center pixel and gradually decreases with the distance from the center. Those pixels with the retouch coefficient K of zero are not retouched; that is, the subject region R is formed of a pixels which have the retouch coefficient K of at least one.

Figure 6A:
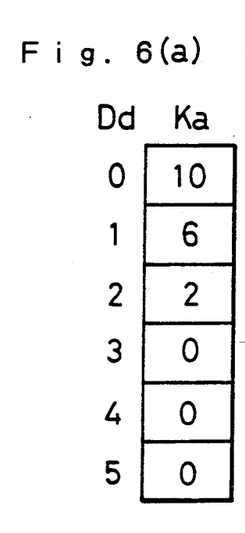
FIGS. 6(a)-6(c) are views showing the coefficient table storing retouch coefficients.
Figure 6B:
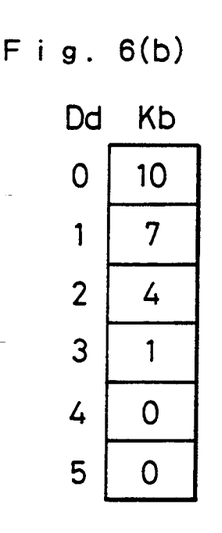
Figure 6C:
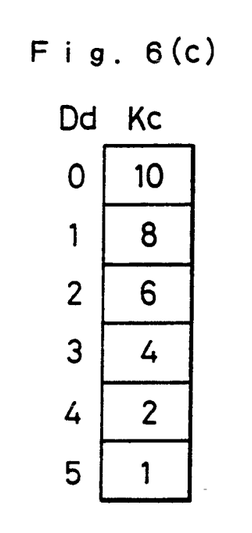

The operator changes the retouch coefficients K using the retouch effect controller 3. By turning the retouch effect controller 3 counterclockwise by a certain amount, for example, causes the coefficient rewriter 63 to rewrite the content of the coefficient table 62 from the reference retouch coefficient Kb to a retouch coefficient Ka shown by a broken line, which has smaller values at pixels other than the center pixel. In contrast, by turning the retouch effect controller 3 clockwise by a certain amount the operator causes the rewriter 63 to rewrite the content from the coefficient Kb to a retouch coefficient Kc shown by a one-dot chain line, which has greater values at pixels other than the center pixel. As described, operation of the retouch effect controller 3 changes only the range to be retouched while the intensity of retouch effect (amount of retouch at the center pixel) remains unchanged. FIG. 6 illustrates the contents of the coefficient tables 62 corresponding to the retouch coefficients Ka, Kb, and Kc, respectively.

In this embodiment, a cursor on the CRT 8 indicates the subject region to be retouched. Operation of the retouch effect controller 3 changes the size of the cursor according to the change of the coefficient K. For example, when the retouch coefficient Ka is set in the coefficient table 62, the cursor covers a 5×5 pixel block in the retouchable region RR wherein the distance data Dd ranges from zero to two. The retouch coefficient Kb causes the cursor to cover a 7×7 pixel block wherein the distance data Dd ranges from zero to three; the retouch coefficient Kc causes the cursor to cover a 11×11 pixel block wherein the distance data Dd ranges from zero to five.

Values of the retouch coefficient K in the coefficient table 62 are rewritten based on the reference value Kb and the control amount of the retouch effect controller 3 by the coefficient rewriter 63 of the arithmetic processing unit 6. A retouch coefficient K(Dd) for each distance data Dd is given by the equation (1):

$$K(Dd) = V*C1*Dd + C2 \tag{1}$$

where V denotes the control amount of the retouch effect controller 3 (for example, the rotational angle of the variable resistor), C1 and C2 are predetermined constants, and the symbol * denotes multiplication. The value of the retouch coefficient K(Dd) is determined by rounding to the nearest whole number in the equation (1). The control amount V corresponds to the parameter in the present invention.

Figure 7:
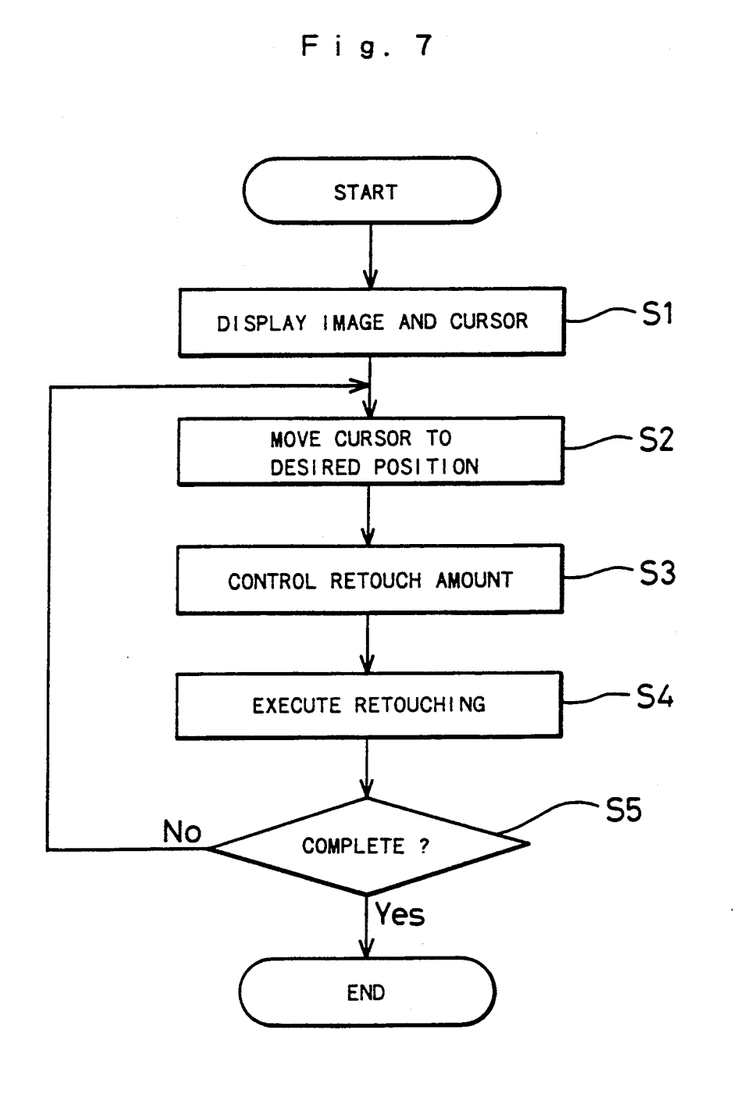
FIG. 7 is a flowchart showing dot etching process by the image processing system of the embodiment.
Figure 8A:
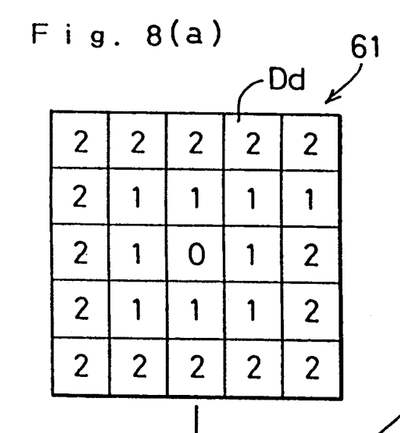
FIG. 8 is a view illustrating retouch process executed in the embodiment.
Figure 8B:
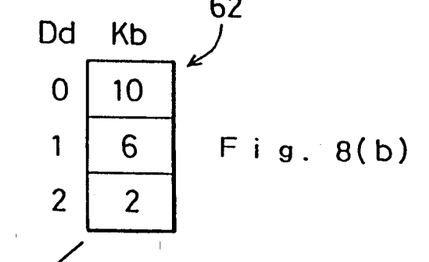
Figure 8C:
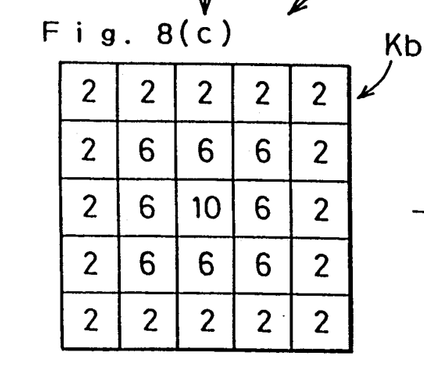
Figure 8D:
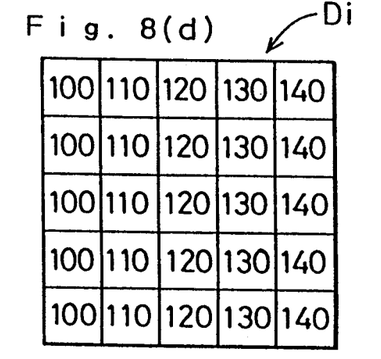
Figure 8E:
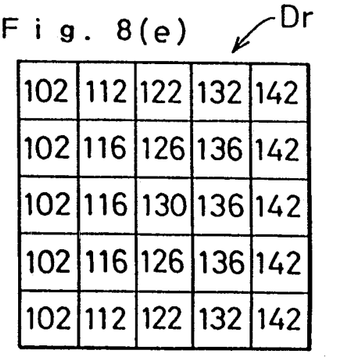

FIG. 7 is a flowchart of dot etching process by the image processing system described above.

At step S1, image data stored in the image memory unit 5 is supplied to the display control unit 7 to be converted into RBG data therein, and a color image shown in FIG. 1 is displayed on the color CRT 8 as a function of the RBG data. Here the RBG data is stored in the display memory 71. A cursor or a window showing the position and dimensions of the subject region R is also shown on the color CRT 8. The cursor defines the subject region of 7×7 pixels corresponding to the standard retouch coefficient Kb.

At step S2, an operator moves the cursor to a desired position with the electronic pen 21 on the digitizer 2.

The program then proceeds to step S3 at which the amount of retouch is controlled with the retouch effect controller 3. Values of the retouch coefficient K in the coefficient table 62 are rewritten according to the above equation (1) by the coefficient rewriter 63, and the cursor on the color CRT 8 is changed to the same size as the subject region R to be retouched. The cursor having the same size as the subject region R enables the operator to easily identify the area to be retouched, and this improves the operation efficiency greatly.

Pressing the electronic pen 21 against the digitizer 2 starts the retouch process at step S4 as follows. First, the address register 51 gives an address of each pixel in the subject region R based on the position of the cursor specified by the digitizer 2 and on the dimensions of the subject region R defined by the retouch effect controller 3. The address is that in the image memory unit 5. Second, the image data at each pixel specified by the address is read out of the image memory unit 5 and output to the arithmetic processing unit 6. The distance data Dd for each pixel of the subject region R is also read out of the distance table 61.

The following description of FIG. 8 includes an example of a so-called modification effect in which an image is modified with retouch coefficients. More particularly, FIG. 8 schematically illustrates the details of the processing at step S4. FIG. 8(a) shows the distance data Dd read out of the distance table 61, and FIG. 8(b) shows the corresponding coefficient table 62. The arithmetic processing unit 6 calculates the retouch coefficient Kb shown in FIG. 8(c) from the above equation (1) based on the data shown in FIGS. 8(a) and 8(b). The arithmetic processing unit 6 then adds the image data Di (see FIG. 8(d)) read out of the image memory unit 5 to the retouch coefficient Kb to generate retouched (dot etched) image data Dr (see FIG. 8(e)). The retouched data Dr is stored in the image memory unit 5 and output to the display control unit 7, whereby the retouched image is displayed on the color CRT 8.

As described above, the amount of retouch is adjusted or controlled at a high speed because the process of the embodiment does not require rewriting of the distance table 61 of a relatively large data volume but only of the coefficient table 62 of a relatively small data volume. Accordingly, a retouched image is instantly displayed on the color CRT 8. This enables the operator to successively and efficiently execute retouch processing while observing a retouched image on the screen.

When the operator finds another region to be retouched on the image at step S5, the program returns to step S2 and repeats steps S2 through S5 until it completes processing for the whole image.

The invention is not limited to the above embodiment but there may be many changes or modifications without departing from the scope of the invention. Some examples of such modifications are given below.

Figures 9A, 9B:
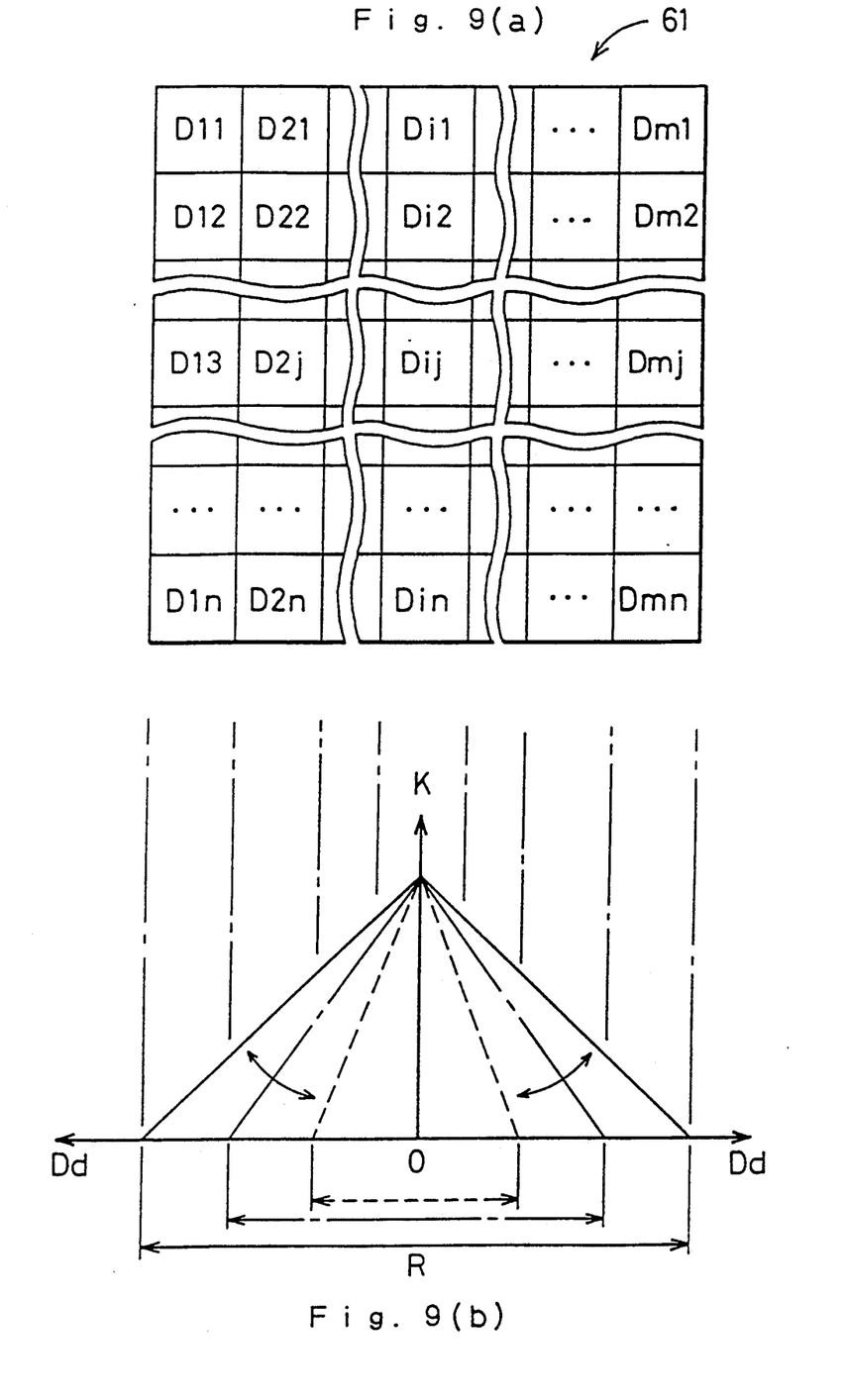
FIG. 9 is an explanatory view showing general examples of the distance table and the coefficient table.

(a) Although the distance table 61 representing the retouchable region RR is a square consisting of 11×11 pixels, it can be a rectangle consisting of m×n pixels as shown in FIG. 9(a) or a circle. When the distance table 61 represents a retouchable region of m×n pixels as shown in FIG. 9(a), the distribution of the retouch coefficient K shown in FIG. 9(b) is changed in proportion to the control amount of the retouch effect controller 3. As seen in FIG. 9(b), while the retouch coefficient K at the center pixel is kept constant, those at the circumjacent pixels are decreased linearly. The distribution of the retouch efficient K is, however, discrete as shown in FIG. 5(b), and thus the straight lines shown in FIG. 9(b) are only approximate.

(b) In the above embodiment, the reference pixel of the distance data Dd is located at the center of the retouchable region RR, but it can be located at any other predetermined positions such as the corner of the retouchable region RR or the subject region R. The distance data can be one representing a distance in a straight line between the standard pixel and each of the other pixels instead of the ordinal number of pixel layers. In general, the distance data can represent any value dependent on a distance between the predetermined reference pixel and each of the other pixels in the retouchable region.

Figure 10:
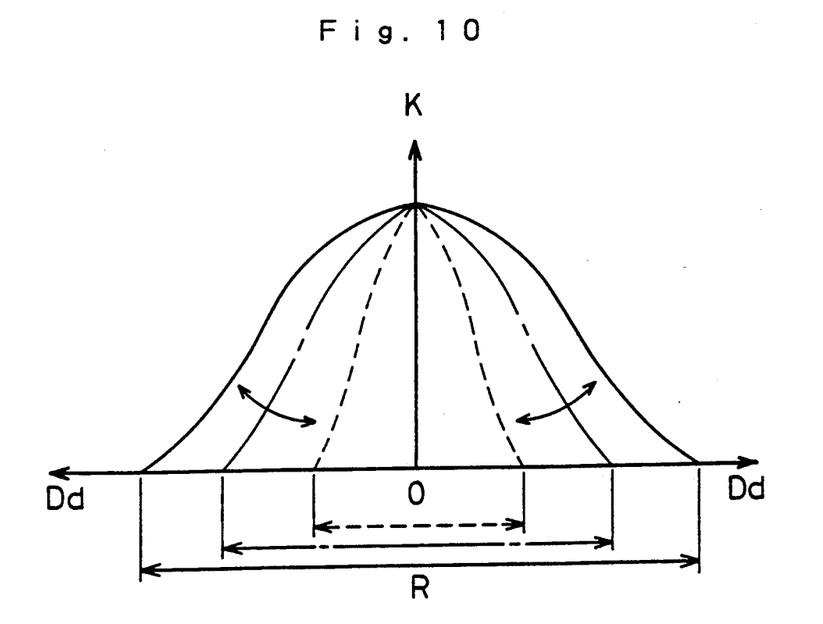
FIG. 10 is a view illustrating one distribution pattern of the retouch coefficient.

(c) The distribution of the retouch coefficient K can be set to provide a predetermined curve with greater retouch effect on the center and smaller effect on the circumjacence as shown in FIG. 10 instead of a straight line of FIG. 9(b). Here the distribution of the retouch coefficient K is determined according to the above equation (1).

Figure 11:
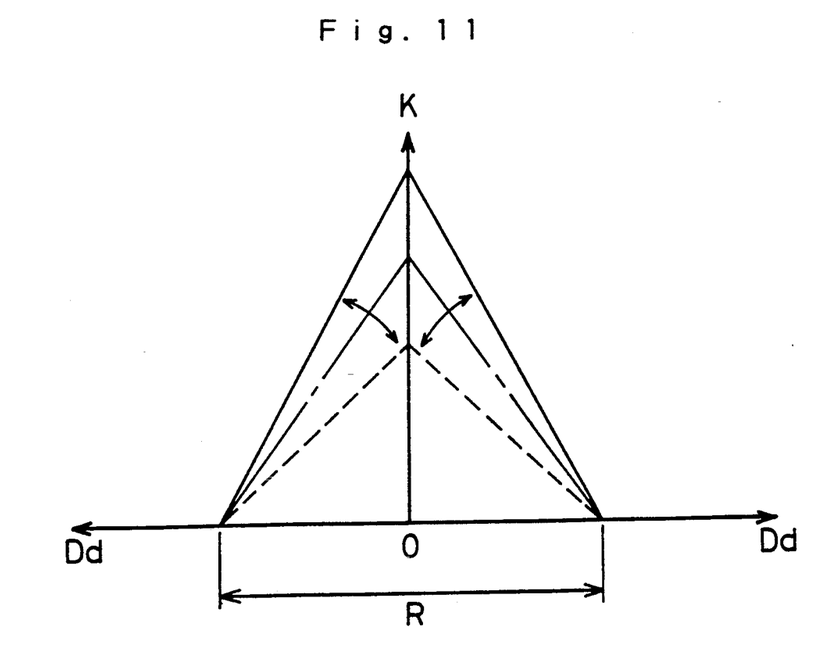
FIG. 11 is a view illustrating another distribution pattern of the retouch coefficient.

(d) Alternatively, the magnitude of the retouch coefficient K may be changed while the range of the subject region is maintained as shown in FIG. 11. Here the retouch coefficient k may be calculated according to the following equation (2) instead of the equation (1):

$$K(Dd) = V*(C3*Dd - C4) \qquad (2)$$

where C3 and C4 are constants.

Although the retouch coefficients K are stored in the coefficient table 62 in the above embodiment, a predetermined function representing the distribution of the retouch coefficient K can be stored in a memory of the arithmetic processing unit 6 and the retouch coefficient K can be calculated according to the function.

Alternatively, the operator can select one of several preset distributions of the retouch coefficient K. The operator can also select a pattern of the coefficient change, such as the pattern according to which the subject region size changes as shown in FIG. 9(b), and the pattern according to which the magnitude of the retouch effect at the standard pixel changes as shown in FIG. 11. The distribution and the change manner is selected with the keyboard 4, for example.

(e) The retouch coefficient K can be controlled with a specific type of electronic pen which changes the intensity of output signals according to the writing pressure. Such electronic pen is sold under the trademark "Electronic Hitsuatu Pen SP-300, or SP-310" by WACOM in Japan. With this type of electronic pen, the operator can simultaneously specify the position of the cursor or the subject region and determine the retouch coefficient K. This further improves the operation efficiency.

(f) Another example of a so-called modification effect in this invention is combining two images at combination ratios which are determined according to distance data. More particularly, the system of the invention is not limited to the dot etching described above but is applicable to other image modification processes including image transplanting.

Image transplanting is a process where part of an image is eliminated and another part is transferred to the eliminated part. For example, an image part of electric poles and wires is replaced by an image part of the sky. When an original image part is combined with a replaced image part at a predetermined ratio, a resultant combined image does not have any observable joints but is naturally integrated. The sizes of the two image parts, that is, the original and the replaced, and the combination ratio are determined with the retouch effect controller 3. The combination ratio is large at the center pixel and small at the circumferential pixels; for example, 100% at the center pixel and 10% at the outer most pixels. When the system of the invention is applied to such image transplanting process, combination ratios are determined according to the distance data and are stored in the coefficient table. The replaced image can be an image part of a predetermined uniform color instead of part of the original image.

According to the above embodiment, the retouch coefficient is readily changed by rewriting the coefficient table 62 of a relatively small data volume while the distance table 61 of a relatively large data volume is not changed. Thus the total retouch processing is executed at a high speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processor for modifying a picture image captured by scanning an original, comprising:
   an image memory for storing image data;
   image display means for displaying said picture image based on said image data;
   input means for specifying a location of a subject region to be modified on the displayed image and for adjusting a parameter which is used to determine modification effect;

reading means for reading a portion of said image data from said image memory, said portion corresponding to said subject region;

distance data generation means for generating respective distance data for each pixel in said subject region, each said distance data being associated with a respective said pixel and indicating a distance between a predetermined reference location in said subject region and said respective pixel;

coefficient determination means for determining a plurality of modification coefficients, each said modification coefficient representing a modification effect to be applied to a respective said pixel, each said modification coefficient being generated as a function of said distance data associated with that respective pixel and said parameter; and arithmetic processing means for processing said portion of said image data as a function of said modification coefficients to thereby modify said image data;

said distance data generation means storing respective standard distance data for each pixel in a prescribed area which is larger than said subject region, each said standard distance data being associated with a respective said pixel and indicating a distance between a reference location and said respective said pixel in said prescribed are, and said distance data generating means outputting said standard distance data for each pixel located in said subject region.

2. An image processor in accordance with claim 1, wherein said coefficient determination means stores a plurality of standard coefficients and determines said modification coefficient by modifying said standard coefficient with said parameter.

3. An image processor in accordance with claim 2, wherein said image display means displays said subject region in said image as a function of said location.

4. An image processor in accordance with claim 3, wherein said reference location is a reference pixel; and said coefficient determination means determines said modification coefficient so that said modification coefficient at said reference pixel in said subject region remains the same and that said modification coefficient at the other pixels in said subject region changes in proportion to said parameter.

5. An image processor in accordance with claim 3, wherein said coefficient determination means determines said modification coefficient so that said modification coefficient in said subject region changes in proportion to said parameter while the size of said subject region where said modification coefficient has a non-zero value remains the same.

6. An image processor in accordance with claim 3, wherein said input means comprises:

a pointing device for specifying said location on said image display means; and a control device for adjusting said parameter.

7. An image processor in accordance with claim 3, wherein said input means comprises a pressure sensitive electronic pen which outputs a first signal representing said location corresponding to the position of said pen on said display means and a second signal representing said parameter according to a pressure applied to said pen.

8. A method of modifying a picture image captured by scanning an original; comprising the steps of:

(a) preparing image data by storing said image data to an image memory;

(b) displaying said picture image based on said image data;

(c) specifying a location of a subject region to be modified on said displayed image and adjusting a parameter which is used to determine modification effect;

(d) reading a portion of said image data from said image memory, said portion corresponding to said subject region;

(e) generating respective distance data for each pixel in said subject region, each said distance data being associated with a respective said pixel and indicating a distance between a predetermined reference location in said subject region and said respective said pixel;

(f) determining a plurality of modification coefficients each said modification coefficient representing a modification effect to be applied to a respective said pixel, each said modification coefficient being generated as a function of said distance data associated with that respective pixel and said parameter; and (g) processing said portion of said image data as a function of said coefficients to thereby modify said image data;

(h) storing respective standard distance data for each pixel located in a prescribed area which is larger than said subject region, each said standard distance data being associated with a respective said pixel in said prescribed area and indicating a distance between a reference location and said respective said pixel; and wherein said step (e) of generating respective distance data comprises the step of reading those of said standard distance data which corresponds to said subject region.

9. A method in accordance with claim 8, further comprising the step of:

(i) storing a plurality of standard coefficients, each standard coefficient corresponding to a respective said pixel in said prescribed area; and wherein said step of determining said plurality of modification coefficients comprises the step of modifying said standard coefficients with said parameter.

10. A method in accordance with claim 9, wherein said step of specifying said location of said subject region includes the step of displaying said subject region as a function of said location.

11. A method in accordance with claim 10, wherein:

said reference location is a reference pixel, and at said step determining a plurality of modification coefficients comprises the step of maintaining said standard coefficient at said reference pixel in said subject region constant and changing said standard coefficients at the remaining said pixels in said subject region in proportion to said parameter.

12. A method in accordance with claim 10, wherein said step determining a plurality of modification coefficients is carried out in such a manner that said modification coefficients in said subject region are determined by modifying said standard coefficients in proportion to said parameter while the size of said subject region where said modification coefficients have a nonzero value remains the same.

13. An image processor for modifying a picture image captured by scanning an original, comprising:
    an image memory for storing image data;
    image display means for displaying said picture image based on said image data;
    input means for specifying a location of a subject region to be modified on the displayed image and for adjusting a parameter which is used to determine modification effect;
    reading means for reading a portion of said image data from said image memory, said portion corresponding to said subject region;
    distance data generation means for generating respective distance data for each pixel in said subject region, each said distance data being associated with a respective said pixel and indicating a distance between a predetermined reference point in said subject region and said respective pixel;
    coefficient determination means for determining a plurality of modification coefficients, each said modification coefficient representing a modification effect to be applied to a respective said pixel, each said modification coefficient being generated as a function of said distance data associated with that respective pixel and said parameter;
    arithmetic processing means for processing said portion of said image data as a function of said modification coefficients to thereby modify said image data;
    said modification effect comprising information derived through an operation selected from a group consisting of operation (A) wherein image data is used for operating arithmetically upon coefficients, and operation (B) wherein particular ratios are combined with first and second images.

14. A method of modifying a picture image captured by scanning an original; comprising the steps of:
    (a) preparing image data by storing said image data to an image memory;
    (b) displaying said picture image based on said image data;
    (c) specifying a location of a subject region to be modified on said displayed image and adjusting a parameter which is used to determine modification effect;
    (d) reading a portion of said image data from said image memory, said portion corresponding to said subject region;
    (e) generating respective distance data for each pixel ins aid subject region, each said distance data being associated with a respective said pixel and indicating a distance between a predetermined reference point in said subject region and said respective said pixel;
    (f) determining a plurality of modification coefficients each said modification coefficient representing a modification effect to be applied to a respective said pixel, each said modification coefficient being generated as a function of said distance data associated with that respective pixel and said parameter;
    (g) processing said portion of said image data as a function of said coefficients to thereby modify said image data; and
    (h) said modification effect comprising information derived through a step selected from a group consisting of step (A) comprising utilizing image data for operating arithmetically upon coefficients, and step (B) comprising combining particular ratios with first and second images.

* * * * *